United States Patent [19]

Santo

[11] Patent Number: 5,439,305
[45] Date of Patent: Aug. 8, 1995

[54] FIXING DEVICE FOR INSIDE REARVIEW MIRROR

[75] Inventor: Antonio F. d E. Santo, Sao Bernardo do Campo, Brazil

[73] Assignee: Metagal Industria E Comercio Ltd., Sao Paulo, Brazil

[21] Appl. No.: 237,179

[22] Filed: May 3, 1994

[30] Foreign Application Priority Data

May 7, 1993 [BR] Brazil .................. 7300601

[51] Int. Cl.6 .................................. B60R 1/00
[52] U.S. Cl. ........................ 403/76; 403/335; 403/380; 403/320; 248/475.1; 248/549
[58] Field of Search .......... 248/223.4, 475.1, 481, 248/549, 900; 359/872; 296/97.7, 97.9, 214; 403/76, 289, 290, 294, 320, 331, 335, 336, 363, 376, 380, 409.1

[56] References Cited

U.S. PATENT DOCUMENTS

| | | | |
|---|---|---|---|
| 3,436,047 | 4/1969 | Foltz | 403/363 X |
| 4,524,941 | 6/1985 | Wood et al. | 248/549 X |
| 4,879,883 | 11/1989 | Bruner | 403/290 X |
| 4,948,085 | 8/1990 | Mittelhäuser | 248/900 X |
| 5,058,851 | 10/1991 | Lawlor et al. | 248/549 |
| 5,356,192 | 10/1994 | Schierau | 296/797.6 |
| 5,377,948 | 1/1995 | Suman et al. | 248/549 |

FOREIGN PATENT DOCUMENTS 2048803 12/1980 United Kingdom ........... 248/900

Primary Examiner—Eric K. Nicholson
Assistant Examiner—Andrea Chop
Attorney, Agent, or Firm—Michael J. Striker

[57] ABSTRACT

A fixing device for an inside rearview mirror of a vehicle comprises an arm having a lower end articulately connectable with a mirror supporting frame of a rearview mirror and an upper end mountable on a vehicle ceiling, and means for mounting the upper end of the arm on the vehicle ceiling and formed as a coupling, the coupling including a first coupling part having a substantially horizontal plate, two side wings extending substantially vertically from the plate, a front wing and a rear end which is open, the first coupling part being also provided with two fitting guides extending on and along the horizontal plate and each including a T-shaped wing section and a rib located between the wing section and a respective one of the side wings, the first coupling part being also provided with a U-shaped spring having a transverse branch and two parallel side branches, the coupling further including a second coupling part having a base plate fixable to the ceiling of the vehicle, an inverted U-shaped central rib and L-shaped side ribs, so that the T-shaped wing sections of the first coupling part are fitted and retained between the U-shaped central rib and L-shaped side wings, while the L-shaped side wings of the second coupling part are inserted between the T-shaped wing sections, the rib and the side wings of the first coupling part.

3 Claims, 1 Drawing Sheet

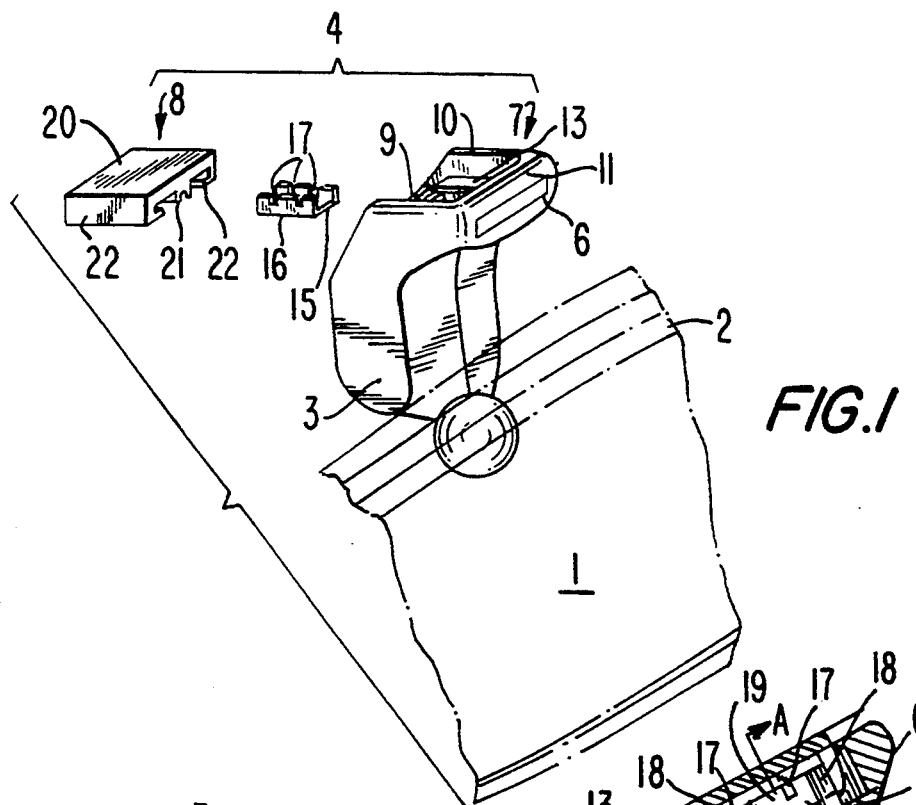
FIG.1
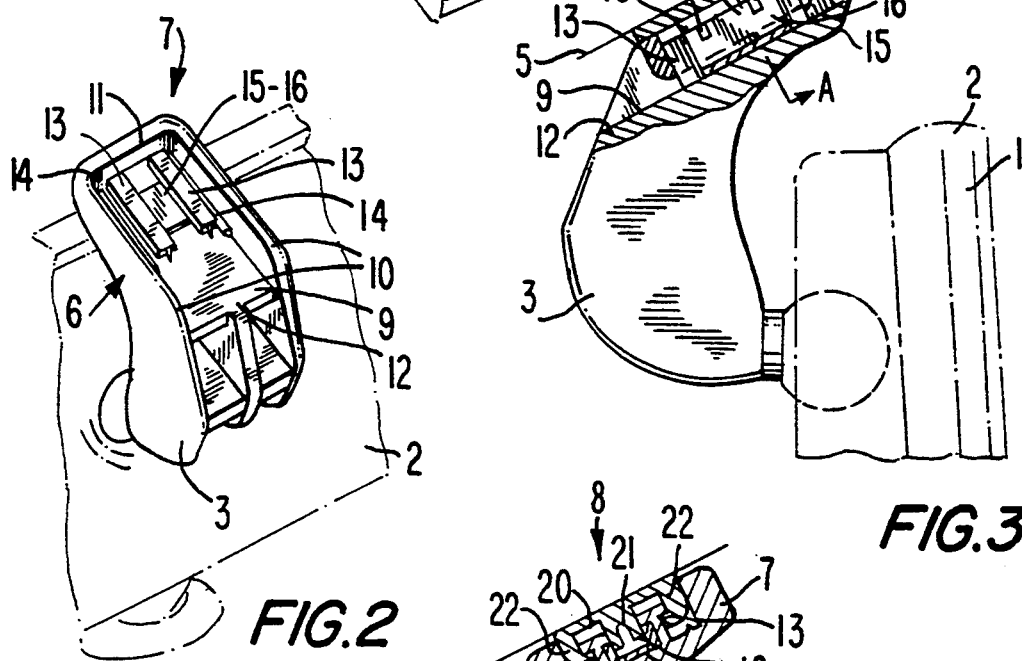
FIG.2
FIG.3
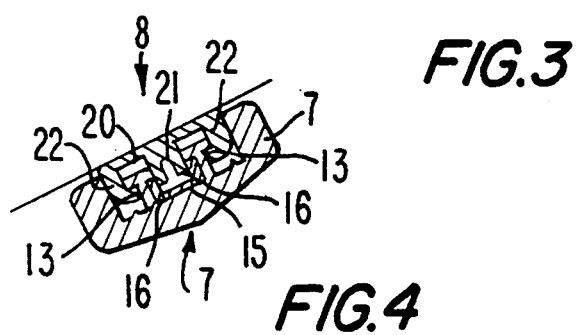
FIG.4

FIXING DEVICE FOR INSIDE REARVIEW MIRROR

BACKGROUND OF THE INVENTION

The present invention relates generally to a fixing device for the inside rearview mirror of a motor vehicle.

Known inside rearview mirrors have a frame which supports a mirror element and is mounted on a fixing device including an arm with an upper end fixed to a vehicle inside ceiling. A type of fixing device for inside rearview mirrors is disclosed for example in my patent application Ser. No. MU 7202212 filed on Dec. 29, 1992. The device provides a connection of the inside rearview mirror to the vehicle ceiling through a coupling having a part arranged on a mirror supporting arm and a part arranged on the vehicle ceiling. This device provides for a sure and easy handling fixation during the assembly operations, and/or replacement of the mirror. However, it has a problem in the fact that vibrations and/or stresses which act on the mirror during the position adjustment operation can cause some slackening in the coupling of the fitted parts which can result in loosening of the mirror.

SUMMARY OF THE INVENTION

Accordingly, it is an object of the present invention to provide a fixing device for an inside rearview mirror of a motor vehicle, which avoids the disadvantages of the prior art.

In keeping with these objects and with others which will become apparent hereinafter, one feature of the present invention resides, briefly stated, in a fixing device for an inside rearview mirror of a vehicle comprising an arm having a lower end articulately connectable with a mirror supporting frame of a rearview mirror and an upper end mountable on a vehicle ceiling, and means for mounting the upper end of the arm on the vehicle ceiling and formed as a coupling, the coupling including a first coupling part having a substantially horizontal plate, two side wings extending substantially vertically from the plate, a front wing and a rear end which is open, the first coupling part being also provided with two fitting guides extending on and along the horizontal plate and each including a T-shaped wing section and a rib located between the wing section and a respective one of the side wings, the first coupling part being also provided with a U-shaped spring having a transverse branch and two parallel side branches, the coupling further including a second coupling part having a base plate fixable to the ceiling of the vehicle, an inverted U-shaped central rib and L-shaped side ribs, so that the T-shaped wing sections of the first coupling part are fitted and retained between the U-shaped central rib and L-shaped side wings, while the L-shaped side wings of the second coupling part are inserted between the T-shaped wing sections, the rib and the side wings of the first coupling part.

It is a further feature of the present invention that each of the side branches of the spring is provided with a longitudinal free edge having two indentures, the spring being fitted between the T-shaped wing sections and fixed by end segments of the side branches limited by the indentures and segments of the side branches intermediate to the indentures, and also are slightly bent inwards, so that the side branches of the spring and the inverted U-shaped rib fit into one another to improve fixation of the coupling parts.

It is yet another feature of the present invention that the arm is formed so that the lower end of the arm is articulately connectable with a back face of said frame while the upper end of the arm is offset relative to a remaining portion of the arm so that in an assembled condition the upper end extends in a direction toward a back region of the vehicle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a fixing device for an inside rearview mirror of a motor vehicle;

FIG. 2 is a perspective of the device, starting from an end of its arm, which is fitted on a base mounted on the ceiling of the vehicle;

FIG. 3 is a view showing the fixing device in accordance with the present invention from the side and in use; and FIG. 4 is a view showing a section taken along the line A—A in FIG. 3.

DESCRIPTION OF THE PREFERRED EMBODIMENTS

A fixing device in accordance with the present invention is used for an inside rearview mirror which includes a mirror element 1 and a frame 2 which supports the mirror element.

The fixing device has an arm 3 having a lower end which is articulately connected to a back face of the frame 2 and an upper end with means for mounting in a region 5 of the vehicle inside its ceiling. The arm 3 is located at a central region of an upper side of the front windshield of the motor vehicle.

The upper end of the arm 3 is identified with reference numeral 6. It extends rearwardly in direction toward a back region of the vehicle body and has a coupling part 7. The coupling part 7 is one part of a coupling 7-8 of the assembly means 4.

A first coupling part 7 has a plate 9, side wings 10 extending from the sides of the plate 9 substantially vertically, and the front part 11 also extending substantially vertically. The side wings 10 and the front side 11 are formed as extensions of corresponding faces of the arm 3. A back side 12 of the plate 9 is free. Two fitting guides 13 and 14 are provided on the plate 9 and extend parallel to one another and along the plate. Each fitting guide 13, 14 has a T-shaped wing section 13 and a rib 14 extending near the section 13 parallel to it. The rib 14 has a smaller height than the section 13 and is located between the section and the corresponding side wing 10.

The coupling part 7 also has a U-shaped blade spring. The blade spring has a transverse branch 15 and side parallel branches 16 extending perpendicularly from the transverse branch 15. Each of the parallel branches 16 has a free edge with two indentures 17. The U-shaped spring is located between two wing sections 13 and is fixed by two end segments 18 of the side branches 16 limited by the indenture 17 and by two segments 19 of the side branches 16 which are intermediate to the indenture 17 and slightly bent inwards.

The second coupling part 8 which cooperates with the first coupling part 7 has a small base plate 20 fixed on the ceiling 5 of the vehicle. It has an inverted U-shaped longitudinal central rib 21 and L-shaped opposite side wings 22. The free ends of the wings 22 are turned to the central rib 21.

As can be seen from FIG. 4, the T-shaped wing sections 13 of the coupling part 4 are fitted and retained between the U-shaped central rib 21 and the L-shaped side wings 22 of the coupling part 8. At the same time, the L-shaped side wings 22 of the coupling part 8 are inserted between the T-shaped wing sections 13, the ribs 14 and the side wings 10 of the coupling part 7. Therefore a fixation among the above mentioned parts is performed. The intermediate segments 19 of the side branches 16 of the spring 15, 16 and the U-shaped rib 21 fit into one another so as to improve the fixation of the coupling part 7 and 8.

It will be understood that each of the elements described above, or two or more together, may also find a useful application in other types of constructions differing from the types described above.

While the invention has been illustrated and described as embodied in a fixing device for inside rearview mirror, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A fixing device for an inside rearview mirror of a vehicle comprising an arm having a lower end articulately connectable with a mirror supporting frame of a rearview mirror and an upper end mountable on a vehicle ceiling, and means for mounting said upper end of said arm on the vehicle ceiling and formed as a coupling, said coupling including a first coupling part having a substantially horizontal plate, two side wings extending substantially vertically from said plate, a front wing and a rear end which is open, said first coupling part being also provided with two fitting guides extending on and along said horizontal plate and each including a T-shaped wing section and a rib located between said T-shaped wing section and a respective one of said side wings, said first coupling part being also provided with a U-shaped spring having a transverse branch and two parallel side branches, said coupling further including a second coupling part having a base plate fixable to the ceiling of the vehicle, an inverted U-shaped central rib and L-shaped side wings, so that said T-shaped wing sections of said first coupling part are fitted and retained between said U-shaped central rib and L-shaped side wings, while said L-shaped side wings of said second coupling part are inserted between said T-shaped wing sections, said rib and said side wings of said first coupling part.

2. A fixing device as defined in claim 1, wherein each of said side branches of said spring is provided with a longitudinal free edge having two indentures, said spring being fitted between said T-shaped wing sections and fixed by end segments of said side branches limited by said indentures and segments of said side branches intermediate to said indentures, and also are slightly bent inwards, so that said side branches of said spring and said inverted U-shaped central rib fit into one another to improve fixation of said first and second coupling parts.

3. A fixing device as defined in claim 1, wherein said arm is formed so that said lower end of said arm is articulately connectable with a back face of said mirror supporting frame while said upper end of said arm is offset relative to a remaining portion of said arm so that in an assembled condition said upper end extends in direction toward a back region of the vehicle.

* * * * *